US011072048B2

(12) United States Patent
Cardone

(10) Patent No.: US 11,072,048 B2
(45) Date of Patent: Jul. 27, 2021

(54) ADVANCED MAGNETIC APPARATUSES

(71) Applicant: Tecnomagnete S.p.A., Milan (IT)

(72) Inventor: Michele Cardone, Trezzano sul Naviglio (IT)

(73) Assignee: MAG-AUTOBLOK TECNOMAGNETE S.P.A., Caprie (IT)

(*) Notice: Subject to any disclaimer, the term of this patent is extended or adjusted under 35 U.S.C. 154(b) by 98 days.

(21) Appl. No.: 16/497,295

(22) PCT Filed: Mar. 19, 2018

(86) PCT No.: PCT/IB2018/051822
§ 371 (c)(1),
(2) Date: Sep. 24, 2019

(87) PCT Pub. No.: WO2018/178801
PCT Pub. Date: Oct. 4, 2018

(65) Prior Publication Data
US 2020/0376617 A1    Dec. 3, 2020

(30) Foreign Application Priority Data
Mar. 28, 2017  (IT) .................. 102017000033967

(51) Int. Cl.
*B23Q 3/154*   (2006.01)
*B25B 11/00*   (2006.01)

(52) U.S. Cl.
CPC .......... *B23Q 3/1546* (2013.01); *B25B 11/002* (2013.01)

(58) Field of Classification Search
CPC  B23Q 3/15; B23Q 3/1546; H01F 7/00; H01F 7/02; H01F 7/0252; H01F 7/0257;
(Continued)

(56) References Cited

U.S. PATENT DOCUMENTS 4,090,162 A * 5/1978 Cardone .............. B23Q 3/1546
335/289
4,847,582 A * 7/1989 Cardone .............. B23Q 3/1546
335/289
(Continued)

FOREIGN PATENT DOCUMENTS

CN    204936041 U    1/2016
EP     2280803 A1    2/2011
(Continued)

OTHER PUBLICATIONS

Gruber, Ralph (PCT Authorized Officer)—Transmittal of the International Search Report and the Written Opinion of the International Searching Authority, or the Declaration—dated Jul. 3, 2018 (12 pages).

*Primary Examiner* — Tyrone V Hall, Jr.
(74) *Attorney, Agent, or Firm* — MH2 Technology Law Group LLP

(57) ABSTRACT

A magnetic apparatus for anchoring ferrous elements may include a support structure housing a plurality of polar units. The support structure has first and second sides at opposite surfaces. The polar units may include: a coil having a support and a conductive element wound on the support; a first magnetic core with a first coercive value, generating a first magnetic flow oriented in a first magnetic direction; and a plurality of second magnetic cores, each having its own coercive value different from the first coercive value. A first part of the second magnetic cores generates a second magnetic flow oriented in a second magnetic direction. A second part of the second magnetic cores generates a third magnetic flow oriented in a third magnetic direction. The third magnetic direction is parallel or antiparallel to the first magnetic direction and has a different direction with respect to the second magnetic direction.

13 Claims, 4 Drawing Sheets

(58) Field of Classification Search
CPC .. H01F 7/021; H01F 7/0215; H01F 2007/208; B25B 11/002
See application file for complete search history.

(56) References Cited

U.S. PATENT DOCUMENTS 6,489,871 B1 * 12/2002 Barton ................. B25B 11/002
335/285
2007/0290780 A1 * 12/2007 Tiberghien ............ B29C 33/305
335/285

FOREIGN PATENT DOCUMENTS

| EP | 2280804 A1 | 2/2011 |
|----|------------|--------|
| WO | 2009/130721 A1 | 10/2009 |
| WO | 2009/130722 A1 | 10/2009 |

* cited by examiner

ADVANCED MAGNETIC APPARATUSES

CROSS-REFERENCE TO RELATED APPLICATION(S)

This application is a national stage entry from International Application No. PCT/IB2018/051,822, filed on Mar. 19, 2018, in the Receiving Office ("RO/IB") of the International Bureau of the World Intellectual Property Organization ("WIPO"), and published as International Publication No. WO 2018/178,801 A1 on Oct. 4, 2018; International Application No. PCT/IB2018/051,822 claims priority from Italian Patent Application No. 102017000033967, filed on Mar. 28, 2017, in the Italian Patent and Trademark Office ("IPTO"), the entire contents of all of which are incorporated herein by reference.

FIELD OF THE INVENTION

The present disclosure relates to an improved magnetic apparatus, according to the preamble of claim 1.

In particular, the present disclosure relates to an electro-permanent magnetic apparatus and even more specifically, it relates to an electro-permanent magnetic apparatus of the self-anchoring and monolithic type.

BACKGROUND ART

The term electro-permanent magnetic apparatus in the continuation of the present description means:
- a magnetic apparatus made with permanent magnets suitably arranged inside the apparatus itself;
- an apparatus that does not require power supply during its normal use in the anchoring step, but that however does require power supply in the activation and deactivation step;
- an apparatus that requires polar collectors for transporting the magnetic flow made with ferromagnetic material.

The need is increasingly felt by manufacturers of magnetic apparatuses, in particular of the electro-permanent type, to be able to meet the requirements of magnetic apparatuses that have more contained production costs without affecting the geometric sizes of the magnetic apparatus itself, magnetic performance with respect to known apparatuses being equal.

Indeed, there is a constant search for putting forward to the market magnetic apparatuses for anchoring ferromagnetic pieces, for example to be subjected to mechanical processing, that are more affordable but ensure the same magnetic anchoring force without varying the geometric sizes of the apparatus itself, such as in particular the thickness of the apparatus.

Indeed, the thickness is an increasingly critical parameter in a magnetic apparatus given that an increase thereof reduces the possibility of use in specific operating machines (such as for example, milling machines or plastic material moulding machines) because the increase of the thickness of the magnetic apparatus reduces the useful space for housing a ferromagnetic piece to be subjected to anchoring since the maximum useful stroke intended for the ferromagnetic piece is predetermined.

In order to reduce the cost of a magnetic apparatus, it is sufficient to increase the size of the anchoring surface of each polar unit forming it. Thereby, the processing time of the magnetic apparatus is reduced because it is possible to obtain the same magnetic force with a smaller number of polar units having greater surface sizes. However, although it is well known and is consolidated in the reference technical field, such solution has the main drawback of the increase of the geometric sizes of the polar units, which implies an inevitable increase of the thickness of the magnetic apparatus itself.

OBJECT OF THE PRESENT INVENTION

Therefore, the object of the present invention is to make a magnetic apparatus that allows reducing the production costs as well as maintaining the geometric sizes unaltered and in particular, the thickness of the magnetic apparatus, magnetic force developed being equal.

The object is achieved with a magnetic apparatus that is characterized according to claim 1 below.

Advantages of the Present Invention

Thanks to the present disclosure, it is possible to obtain a magnetic anchoring apparatus that has a lower production cost with respect to the known magnetic apparatuses and which keeps its thickness unvaried with respect to such magnetic anchoring apparatuses, anchoring force that can be developed being equal.

Such result is obtained by making, in the thickness of the known magnetic apparatuses, new polar units having greater surface sizes with respect to the sizes of the polar units provided in the known magnetic apparatuses. By doing this, it is possible to reduce the number of polar units required to make the new magnetic apparatus, anchoring force developed by the anchoring surface of the magnetic apparatus being equal.

BRIEF DESCRIPTION OF THE DRAWINGS

The disclosure is now described in greater detail with reference to a preferred embodiment thereof, given by mere way of a non-limiting example and illustrated in the accompanying drawings, in which.

DETAILED DESCRIPTION

Figure 1:
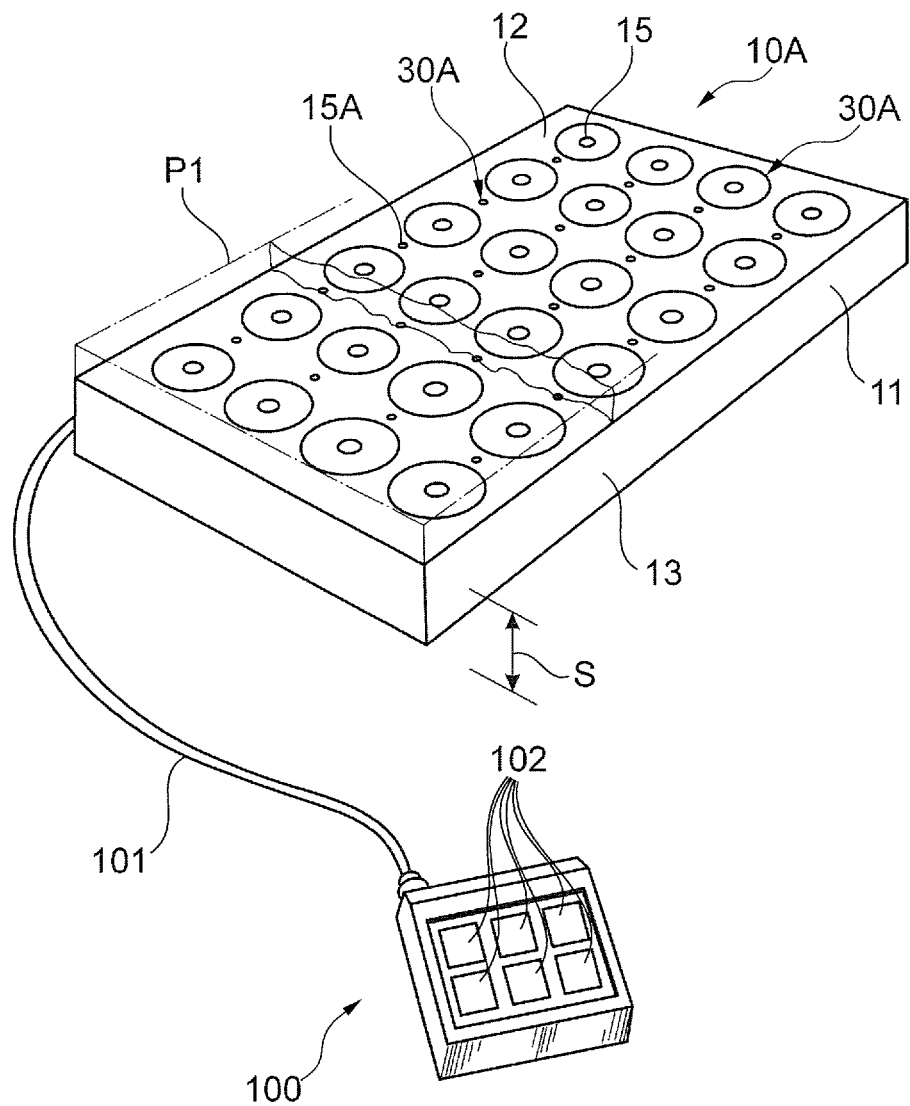
FIG. 1 shows a perspective view of a magnetic apparatus when it is associated with a piece to be subjected to mechanical processing, and of the control unit, according to the present invention.

The embodiment illustrated in the accompanying drawings is diagrammatically depicted, is not necessarily to scale, and does not necessarily have the proportions depicted between the various forming elements.

Even when not expressly indicated, the individual characteristics described in reference to the specific embodiments shall be intended as accessories and/or interchangeable with other characteristics described in reference to other embodiments.

With reference to the accompanying drawings, a magnetic anchoring apparatus is indicated as a whole with 10A.

Preferably, in the continuation of the present description, a magnetic anchoring apparatus of the electro-permanent, self-anchoring and monolithic type is described, without the definition of the invention losing generality.

The magnetic apparatus 10A for magnetically anchoring ferrous elements P1 comprises a support structure 11 in which thickness S a plurality "N" of polar units 30A is housed.

In particular, the support structure 11 identifies respectively a first and a second side 12, 13 at the opposite surfaces with the greatest extension.

Preferably, the first and the second side 12, 13 extend parallel to each other so as to define respective planes.

It is worth noting that the side 12 is intended to be the plane or the surface on which the ferrous elements P1 to be subjected to mechanical processing will be magnetically anchored, that is the ferrous pieces to be processed, where the side 13 is intended to be the plane or surface that can be magnetically anchored to another ferrous element such as for example, a bench of the machine tool.

It is also worth noting that the "N" polar units 30A may be freely arranged inside the structure 11, that is they may be arranged without any predefined geometrical scheme being followed.

However, according to a preferred embodiment, the "N" polar units 30A are arranged in the structure 11 according to a scheme according to which the "N" polar units 30A are arranged in the form of a matrix.

Preferably, in such matrix configuration of the "N" polar units 30A, the centre lies along the lines and/or the columns forming the aforesaid matrix.

Moreover, according to the usual methods of using the apparatus 10A, blind holes 15 may be made in the centre of the "N" polar units 30A. Preferably, such blind holes 15 may be threaded blind holes filled with threaded fill insert such as helicoils.

Moreover for specific applications, the support structure 11 may comprise a further plurality of blind holes 15A which are arranged on the first side 12 of the apparatus 10. In particular, the blind holes 15A may be arranged in the form of a matrix and interposed between the "N" polar units 30A.

Each polar unit 30A comprises at least one respective polar collector 50, a first magnetic core 40 with a first coercive value, a coil 30 and a plurality of second magnetic cores 90A, 90B, each having its own coercive value which is different from the first coercive value.

Figure 3:
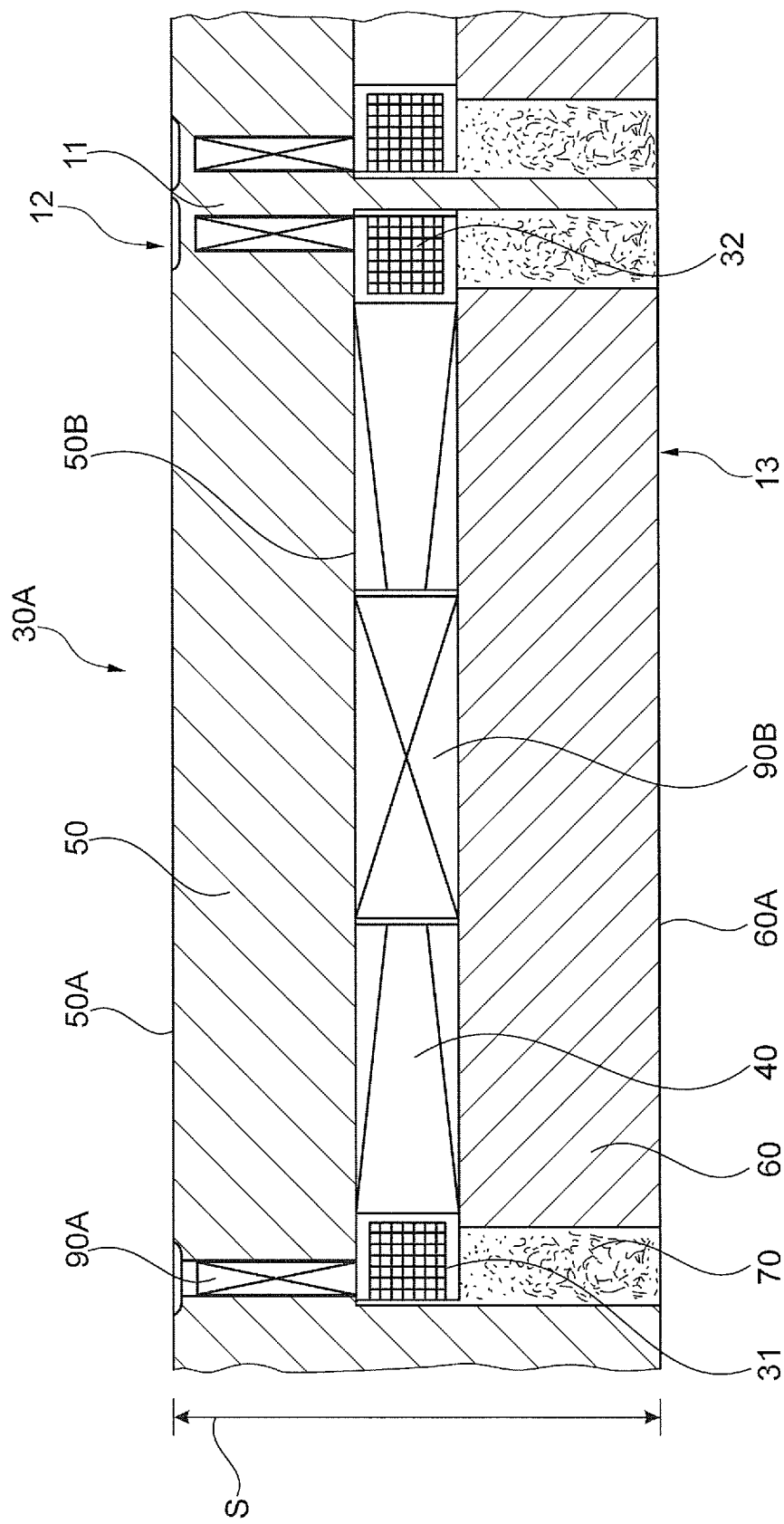
FIG. 3 shows a sectional side view of the apparatus of FIG. 1.

With reference to FIG. 3, in the embodiment therein illustrated, the first polar collector 50 is an integral part of the support structure 11 because it is obtained by means of mechanical processing processes from solid, such as removal of material.

In particular, the polar collector 50 defines a bottom 50B and is made in one piece with the support structure 11 given that the upper portion 50A thereof identifies a portion of the first side 12 so as to obtain a magnetic apparatus 10 of monolithic type.

The polar unit 30A comprises a second polar collector 60, a surface 60A thereof with the greatest extension identifying a portion of said second side 13. The second polar collector 60 is positioned next to the first magnetic core 40 to sandwich such magnetic core 40 against the bottom 50B of the first polar collector 50.

It is worth noting that the sizes of the second polar collector 60 are suitable for causing the magnetic flow, or the majority of it, generated by the magnetic cores 40, to come out of the magnetic apparatus 10A in order to have the surface of said second side 13 magnetically active, that is have a value of magnetic force sufficient to anchor the magnetic apparatus 10A through the second side 13.

This ensures the possibility of making a self-anchoring as well as monolithic magnetic apparatus.

Advantageously, the coil 30 is positioned externally to and at the first magnetic core 40 in order to modify the operating conditions of the magnetic apparatus 10A, and in particular the magnetization status of the first magnetic core 40.

According to one aspect, an operation of filling the gaps, for example by means of resin casting 70, is provided in order to cover the coil 30 and also to ensure the cohesion between the second polar collector 60 and the first magnetic core 40 with the coil itself.

The resin 70 is therefore intended to guarantee the uncatchability of the aforesaid elements and also aims to guarantee the impermeability to impurities and/or to the leakage of liquids in the area in which the coil 30 is arranged.

Advantageously, also with reference to FIG. 1, there is provided a control unit 100 operatively connected to the magnetic apparatus 10A in order to control the operating conditions of the apparatus itself.

In particular, the control unit 100 is electrically associated to the magnetic apparatus 10A by means of an electric connection 101 for controlling the electric windings 30 so as to modify the magnetization status of the magnetic cores 40 as a function of the specific operating conditions.

The control unit 100 comprises a plurality of buttons 102 through the pressing of which the operator may control the magnetic apparatus 10A to operate according to the operating conditions, as indicated in greater detail in the continuation of the present description.

For a more detailed description of the components described above, it is possible to refer to patents EP 2280803 and EP 2280804 to the same Applicant, which contents are intended integrally indicated herein.

Advantageously, in order to obtain an increase of the polar surface without modifying the thickness S of the magnetic apparatus 10A, there is provided for the first magnetic core 40 to generate a first magnetic flow which is oriented in a first magnetic direction, while a first part 90A of the plurality of second magnetic cores 90A, 90B generates a second magnetic flow oriented in a second magnetic direction and a second part 90B of the plurality of second magnetic cores 90A, 90B generates a third magnetic flow oriented in a third magnetic direction.

In particular, the third magnetic direction is parallel to the first magnetic direction and of different direction, preferably perpendicular, with respect to the second magnetic direction.

Figure 3A:
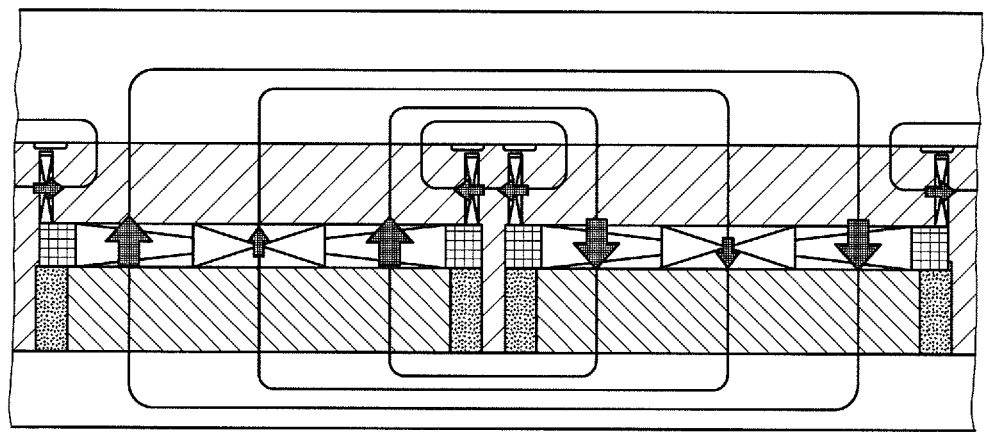
FIG. 3a shows a sectional side view of the apparatus of FIG. 1, in the activation condition.
Figure 3B:
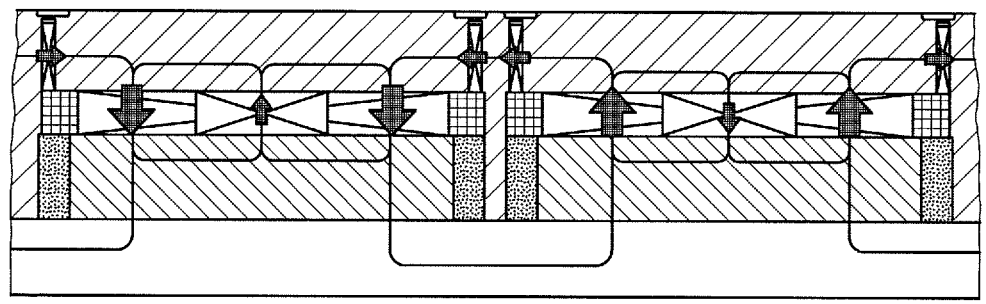
FIG. 3b shows a sectional side view of the apparatus of FIG. 1, in the deactivation condition.
Figure 3C:
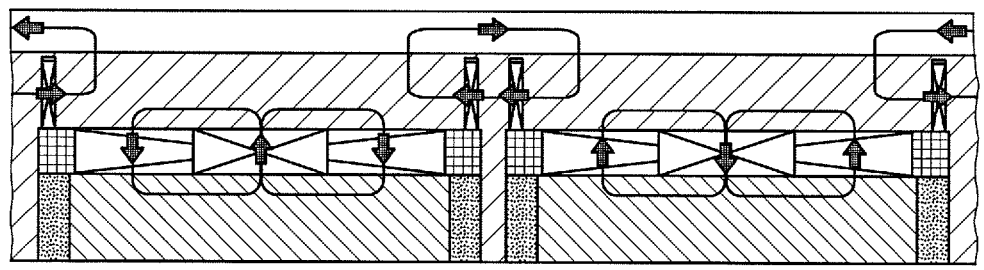
FIG. 3c shows a sectional side view of the apparatus of FIG. 1, in the transport condition.

An example of the aforesaid three magnetic directions generated by the respective magnets 40, 90A and 90B in the polar unit 30A are exemplified in FIGS. 3a, 3b and 3c for different working conditions of the magnetic apparatus 10A.

In particular, FIGS. 3a, 3b and 3c show side sectional views of the magnetic apparatus 10A in the activation condition, in the deactivation condition and in the transport condition, respectively.

In particular, the increase of the polar surface without modifying the thickness S of the magnetic apparatus 10A can be obtained due to the fact that the magnetic flow of the magnet 40, having a first coercive value, simultaneously is parallel to the magnetic flow generated by the second part 90B of the plurality of second magnetic cores 90A, 90B and is oriented in a different direction with respect to the first part 90A of the plurality of second magnetic cores 90A, 90B both having a different value from the first coercive value.

It is also worth noting that such increase of the polar surface without modifying the thickness S is at least initially achievable without specifying what the position of the first magnetic core 40 is to be, like the first part 90A and the second part 90B of the plurality of second magnetic cores 90A, 90B in the polar unit 30A.

Indeed, it is precisely the possibility of combining the three magnetic flows that allows increasing the surface size of the polar units 50 and 60 and therefore reducing the number of polar units 30A to be made, magnetic force developed being equal.

As mentioned, there are three operating conditions that characterize the magnetic apparatus 10A, in particular the one of the self-anchoring electro-permanent type, that is an activation condition (FIG. 3a), a deactivation condition (FIG. 3b) and a transport condition (or assembly/disassembly condition to/from the machine bench) (FIG. 3c).

The first two conditions, relative to FIGS. 3a and 3b, are known and it is possible to deduce the operation thereof from the description in patents EP 2280803 and EP 2280804 to the same Applicant, which contents are intended integrally indicated herein.

The transport condition (or assembly/disassembly condition) (FIG. 3c) instead is different with respect to the other two because in this particular condition, there is a need to cancel the magnetic force generated by the electro-permanent magnetic apparatus on its side 13, that is the side that is magnetically anchored to the bench of the machine tool.

To obtain such result, there is a need to guarantee the balance between the magnetic flow generated by the second part 90B of the plurality of second magnetic cores 90A, 90B and the magnetic flow generated by the magnetic core 40.

This condition is guaranteed due to the electronic control apparatus that allows controlling such condition by measuring the magnetic flow generated by the side 13.

For the purposes of the present description, it is worth noting that in the first operating condition (activation condition) of the magnetic apparatus (FIG. 3a), the magnetic flow generated by the first magnetic core 40 is to be equal to the magnetic flow generated by the plurality of second magnetic cores 90A, 90B, while in the second operating condition (deactivation condition) of the magnetic apparatus (FIG. 3b), the magnetic flow generated by the first magnetic core 40 is to be equal and opposed to the magnetic flow generated by the plurality of second magnetic cores 90A, 90B; finally in the third operating condition (transport condition) of the magnetic apparatus (FIG. 3c), the magnetic flow generated by the first magnetic core 40 is to be equal and opposed to the magnetic flow generated by the second part 90B of the plurality of second magnetic cores 90A, 90B.

This ensures the necessary balance between the magnetic flows so as to allow a correct operation of the magnetic apparatus itself.

It is also worth noting that the first operating condition (FIG. 3a) is defined anchoring operating condition of the apparatus 10A; here, an anchoring force develops on the planes 12 and 13, while the second operating condition (FIG. 3b) is defined deactivation operating condition of the apparatus 10A; here no anchoring force is developed on the plane 12 while an anchoring force is always developed on the plane 13; finally the third operating condition (FIG. 3c) is defined as transport operating condition of the apparatus 10A; here an anchoring force is developed on plane 12, where a suitable ferromagnetic plate is positioned, while no anchoring force is developed on the plane 13.

Figure 2:
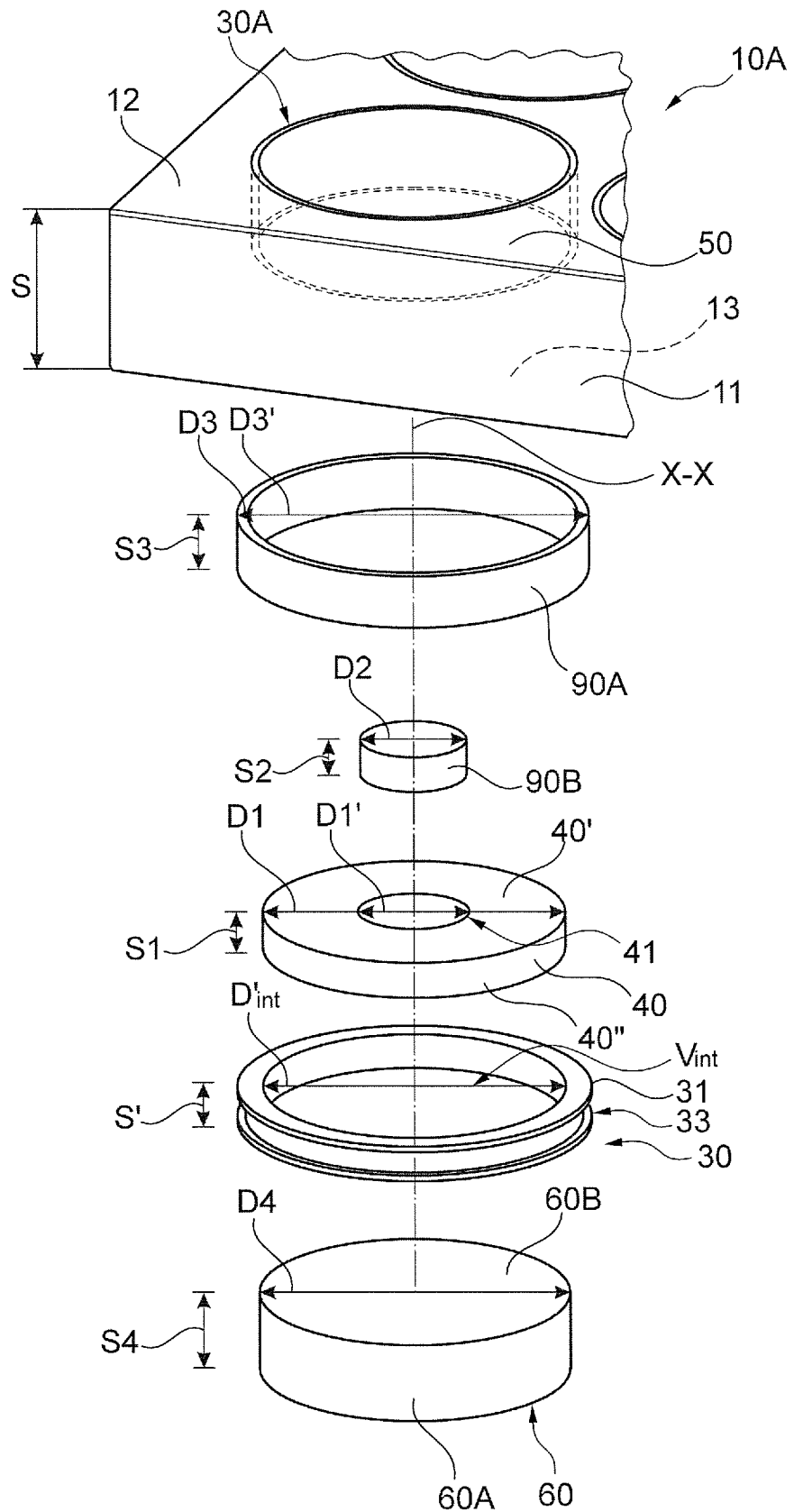
FIG. 2 shows an exploded, partially sectioned perspective view of the apparatus of FIG. 1.

With reference now to FIG. 2 and FIG. 3, it is worth noting that the coil 30 provides a support 31 of predetermined profile and an electric conductive element 32 wound on such support, such support 31 defining a volume Vint.

In one embodiment, in order to obtain increased efficiency of the magnetic apparatus 10, it is provided for the first magnetic core 40 and/or the second part 90B of the plurality of second magnetic cores 90A, 90B to be arranged at least partially inside the volume Vint defined by the support 31.

In other words, in order to obtain improved efficiency of the apparatus 10A, the first magnetic core 40 and/or the second part 90B of the plurality of second magnetic cores 90A, 90B are to be arranged at least partially inside the volume Vint.

For example, both the first magnetic core 40 and the second part 90B may be partially contained in Vint, or both the first magnetic core 40 and the second part 90B may be completely contained in Vint, or only the first magnetic core 40 is completely contained in Vint while the second part 90B is partly contained in Vint, or vice versa.

In particular, the support 31 is shaped so as to at least partially envelope the first magnetic core 40 and the second part 90B of the plurality of second magnetic cores 90A, 90B.

In FIGS. 2 and 3, which show the preferred embodiment which corresponds to the most efficient embodiment of the magnetic apparatus 10A, the first magnetic core 40 and the second part 90B of the plurality of second magnetic cores 90A, 90B are completely contained inside the volume Vint. Therefore in such preferred embodiment, the support 31 completely envelops, in its volume Vint, both the first magnetic core 40 and the second part 90B of the plurality of second magnetic cores 90A, 90B, that is they do not encroach or project or have portions thereof that lie outside the volume Vint defined by the support 31.

It is worth noting that the first part 90A alone of the plurality of second magnetic cores 90A, 90B is conveniently arranged externally to the volume Vint defined by the support 31.

In particular, as is shown in FIGS. 2 and 3, the part 90A of the plurality of second magnetic cores 90A, 90B is arranged around the first collector 50 of the polar unit 30A to generate the second magnetic flow, which is oriented in the second magnetic direction.

Such second magnetic direction is, in the preferred embodiment, perpendicular with respect to the first magnetic direction of the flow generated by the core 40.

The second part 90B of the plurality of second magnetic cores 90A, 90B, which is different from the first part 90A, as mentioned is at least partially contained in volume Vint of the support 31 of the coil 30 and is configured to generate a third magnetic flow oriented in a third magnetic direction which is parallel with respect to the first magnetic direction of the magnetic flow generated by the first magnetic core 40.

According to one aspect, there is provided for the magnetic core 40 to be a magnetic core of the permanently reversible type which materializes in a magnet of the Alnico type, while the plurality of magnetic cores 90A, 90B is to be a plurality of magnetic cores of the permanently magnetized non-reversible type which materialize in ferrite, samarium cobalt or neodymium-ferro-boron.

Other types of materials for the magnetic core 40 or for the plurality of magnetic cores 90A, 90B may be provided.

Therefore, when suitably controlled by the control unit 100, the coil 30 has the task of modifying the magnetization status of the magnetic core 40.

According to a further aspect, ferromagnetic supports (not shown in the drawings) may also be housed inside the volume Vint of the support element 31 in order to eliminate any empty spaces such as to create air gaps zones.

In an alternative embodiment (not shown in the drawings), there is provided for the first magnetic core 40 to be partially or completely contained inside the volume Vint, while the second part 90B of the plurality of second magnetic cores 90A, 90B may also be arranged externally to the volume Vint. In this scenario, together with the first magnetic core 40 partially or completely contained inside the volume Vint, there will also be provided for one or more ferromagnetic supports to be arranged inside the volume Vint in order to eliminate any empty spaces such as to create air gap zones.

In another alternative embodiment (not shown in the drawings), the first magnetic core 40 may be made with two or more magnetic portions, that is it may be made using different magnetic cores having different shapes and sizes from one another; similarly, also both the parts 90A and 90B of the plurality of second magnetic cores 90A, 90B may be made with a single magnetic core or with several magnetic cores also having different shape and sizes from one another. It is preferable for such magnetic elements forming the first magnetic core 40 and the second part 90B of the plurality of second magnetic cores 90A, 90B to be arranged in such a manner so that the elements forming the second part 90B of the plurality of second magnetic cores 90A, 90B are barycentric with respect to the elements forming the first magnetic core 40.

According to a preferred implementation aspect, also with reference to FIG. 2, the elements forming each polar unit 30A materialize in substantially circular or disc-like elements. In particular:

the polar collector 50, the first part 90A of the plurality of second magnetic cores 90A, 90B, the second part 90B of the plurality of second magnetic cores 90A, 90B, the first magnetic core 40, the coil 30 and the polar collector 60 are coaxial and symmetrical along the axis X-X.

Indeed, the support 31 has an annular profile of thickness S' and an inner diameter D'int, so that the volume Vint is that volume calculated from the inner diameter for the thickness S' of the support 31.

In particular, the profile of the support 31 defines a groove 33 (opposite to the position of the inner volume Vint) in which the electric conductive element 32 (not shown in FIG. 2) is inserted.

Moreover, the first magnetic core 40 comprises a single magnetic core, where the second part 90B of the plurality of second magnetic cores 90A, 90B also comprises a single magnetic core.

In particular, the first magnetic core 40 has an annular profile of thickness S1 and having an outer diameter D1 and an inner diameter D1' such as to define a hole 41, preferably a through hole. The first magnetic core 40 defines two surfaces with the greatest extension 40' and 40" which are flat and parallel to each other.

Preferably, the through hole 41 is arranged in a central position with respect to the surfaces 40', 40" of the first magnetic core 40.

It is worth noting that the thickness S1 is at most equal to the thickness S' of the support 31, given that the first magnetic core 40 is to be contained in the volume Vint in the condition of maximum efficiency.

Advantageously, in this preferred embodiment, the second part 90B of the plurality of second magnetic cores 90A, 90B materializes in a solid cylinder of thickness S2 and diameter D2 which is arranged in such through hole 41 so as to be completely contained therein, and therefore also in the thickness S' of the support 31.

In other words, should the first magnetic core 40 and the second part 90B of the plurality of second magnetic cores 90A, 90B be integrally contained in the thickness S', the thickness S' must be greater than or equal to the greater of the thickness S1 and the thickness S2.

Therefore, in the preferred embodiment, the first magnetic core 40 is shaped in the manner of toroid having outer diameter D1, inner diameter D1' and thickness S1, while the part 90B of the plurality of second magnetic cores 90A, 90B, which is inserted in the through hole 41, is shaped like a solid cylinder having diameter D2 and thickness S2.

Therefore, in order not to increase the thickness S of the magnetic apparatus 10A, the second part 90B of the plurality of second magnetic cores 90A, 90B was introduced inside the first magnetic core 40.

Again, according to the preferred embodiment:
the first part 90A of the plurality of second magnetic cores (90A, 90B) materializes in an annular element of outer diameter D3 and inner diameter D3' and height S3,
the second polar collector 60 materializes in a solid cylinder of diameter D4 and thickness S4.

It is worth noting that the second polar collector 60 defines two opposed and parallel surfaces with the greatest extension 60A and 60B.

In relation to that described above with reference to the preferred embodiment, the new magnetic apparatus 10A has the same magnetic surface performance on the side 12 using an identical thickness S to the background art but requiring a smaller number of poles, magnetic force developed on such side 12 being equal.

Such reduction is directly proportional to the increase of the anchoring surface of the single polar unit. Therefore, if it is necessary to make 100 poles in a standard magnetic apparatus (i.e. pole of 70 mm in diameter) to ensure the magnetic performance required for the anchoring, due to the present invention it is possible to make a magnetic apparatus in the same thickness S because it is possible to construct single polar units with a 40% larger polar surface (i.e. pole of 90 mm in diameter).

This allows obtaining the same previous magnetic performance with 40% less poles.

Obviously, in order to meet contingent and specific needs, those skilled in the art may make several modifications and variants to the magnetic apparatus described above, all however contained within the scope of protection of the invention as defined by the following claims.

The invention claimed is:

1. A magnetic apparatus for magnetically anchoring ferrous elements, the magnetic apparatus comprising:
a support structure in whose thickness a plurality of polar units is housed;
wherein the support structure has a first side and a second side at opposite surfaces with a greatest extension,
wherein each of the plurality of polar units comprises:
a coil having a support of predetermined profile and an electric conductive element wound on the support;
a first magnetic core with a first coercive value, generating a first magnetic flow oriented in a first magnetic direction; and
a plurality of second magnetic cores, each having its own coercive value different from the first coercive value;
wherein a first part of the plurality of second magnetic cores generates a second magnetic flow oriented in a second magnetic direction, wherein a second part of the plurality of second magnetic cores generates a third magnetic flow oriented in a third magnetic direction, wherein the third magnetic direction is parallel or antiparallel to the first magnetic direction and has a different direction with respect to the second magnetic direction, wherein the support of the coil defines a volume, and wherein the first magnetic core and/or the second part of the plurality of second magnetic cores is arranged at least partially inside the volume defined by the support.

2. The magnetic apparatus of claim 1, wherein the third magnetic direction is perpendicular with respect to the second magnetic direction.

3. The magnetic apparatus of claim 1, wherein the first part of the plurality of second magnetic cores is arranged externally to the volume defined by the support.

4. The magnetic apparatus of claim 3, wherein the first part of the plurality of second magnetic cores is arranged around a first polar collector.

5. The magnetic apparatus of claim 1, wherein the first magnetic core and/or the second part of the plurality of second magnetic cores are completely contained in the volume defined by the support.

6. The magnetic apparatus of claim 1, wherein the first magnetic core and/or the second part of the plurality of second magnetic cores each comprises two or more magnetic portions separated from one another.

7. The magnetic apparatus of claim 6, wherein the two or more magnetic portions of the second part of the plurality of second magnetic cores are arranged barycentrically with respect to the two or more magnetic portions of the first magnetic core.

8. The magnetic apparatus of claim 1, wherein the first magnetic core comprises a single magnetic core defining two surfaces with a greatest extension that are parallel to each other and a through hole between the two surfaces, wherein the first magnetic core has a thickness which is less than or equal to a thickness of the support, wherein the second part of the plurality of second magnetic cores comprises a single magnetic core that is arranged in the through hole, and wherein the second part of the plurality of second magnetic cores has a thickness which is less than or equal to the thickness of the support.

9. The magnetic apparatus of claim 1, wherein the support has an annular profile having a predetermined thickness and an inner diameter, and wherein the volume is calculated from the inner diameter for the predetermined thickness of the support.

10. The magnetic apparatus of claim 1, wherein the first magnetic core consists of a magnetically reversible material, and wherein the plurality of second magnetic cores consists of a non-reversible magnetic material.

11. The magnetic apparatus of claim 1, wherein the first magnetic core is arranged at least partially inside the volume defined by the support, and wherein the second part of the plurality of second magnetic cores is arranged externally to the volume defined by the support.

12. The magnetic apparatus of claim 1, further comprising a command and control unit operatively connected to the plurality of polar units to control the magnetization, demagnetization and/or transport condition of the first side and/or the second side of the support structure.

13. The magnetic apparatus of claim 1, wherein the plurality of polar units comprises a first polar collector and a second polar collector, wherein an upper surface of the first polar collector forms an anchoring plane, and wherein a side surface of the first polar collector forms a support plane of the magnetic apparatus.

* * * * *